US008650619B2

(12) United States Patent
Sundaram et al.

(10) Patent No.: US 8,650,619 B2
(45) Date of Patent: Feb. 11, 2014

(54) METHOD AND APPARATUS OF AUTOMATED DISCOVERY IN A COMMUNICATION NETWORK

(75) Inventors: Ganapathy Sundaram, Hillsborough, NJ (US); Semyon B. Mizikovsky, Morganville, NJ (US); Ioannis Broustis, Millburn, NJ (US)

(73) Assignee: Alcatel Lucent, Paris (FR)

( * ) Notice: Subject to any disclaimer, the term of this patent is extended or adjusted under 35 U.S.C. 154(b) by 283 days.

(21) Appl. No.: 12/859,503

(22) Filed: Aug. 19, 2010

(65) Prior Publication Data

US 2012/0047558 A1 Feb. 23, 2012

(51) Int. Cl.
*G06F 7/04* (2006.01)
(52) U.S. Cl.
USPC .............................. 726/4; 713/168
(58) Field of Classification Search
None
See application file for complete search history.

(56) References Cited

U.S. PATENT DOCUMENTS

| | | | |
|---|---|---|---|
| 2006/0259602 A1* | 11/2006 | Stewart et al. | 709/223 |
| 2009/0287766 A1 | 11/2009 | Chan et al. | |
| 2011/0213871 A1* | 9/2011 | DiGirolamo et al. | 709/223 |
| 2011/0265158 A1* | 10/2011 | Cha et al. | 726/6 |
| 2011/0307404 A1* | 12/2011 | Wickel et al. | 705/331 |
| 2013/0046841 A1* | 2/2013 | Park et al. | 709/206 |

FOREIGN PATENT DOCUMENTS

WO PCT/US2011/045304 11/2011

* cited by examiner

*Primary Examiner* — Fikremariam A Yalew
(74) *Attorney, Agent, or Firm* — Wolff & Samson PC

(57) ABSTRACT

An automated method is provided for mutual discovery between a network entity and a client entity that cooperate for providing a service in a machine-to-machine environment. In an embodiment, the network entity receives an identifier in a communication from a server on behalf of the client entity. At some point in time, the network entity receives a communication containing the identifier from the client entity. Before or after receiving the client entity communication, the network entity discovers itself to the client entity. Some time after receiving the client entity communication, the network entity authenticates the client entity, establishes a permanent security association with the client entity, and initiates the service.

6 Claims, 7 Drawing Sheets

| Version | Type | M2MO Identity | | Priority | Count IDs |
|---|---|---|---|---|---|
| Auth Type | | Invitation Interval | | | Checksum |
| M2M Device Identity (1) | | | | | |
| ... | | | | | |
| M2M Device Identity (N) | | | | | |
| M2M Service Parameters | | | | | |
| Authentication Data | | | | | |

FIG. 8

| Version | Type | M2MO Identity | Advertisement Interval | Priority |
|---------|------|---------------|------------------------|----------|
| Auth Type | | | | Checksum |
| M2M Service Parameters | | | | |
| Authentication Data | | | | |

FIG. 9

| Version | Type | M2M Device Identity | Priority |
|---|---|---|---|
| Auth Type | | Transmission Interval | Checksum |
| M2M Service Parameters | | | |
| Authentication Data | | | |

FIG. 10

METHOD AND APPARATUS OF AUTOMATED DISCOVERY IN A COMMUNICATION NETWORK

FIELD OF THE INVENTION

The invention relates to methods by which entities on a communication network make themselves known to one another.

BACKGROUND ART

As automated communication between devices on networks becomes more and more ubiquitous, the need grows for the automation of transactions of ever greater complexity. This, in turn, calls for the solution of ever more problems in the field of network communication protocols.

One such class of problems relates to the establishment of mutual recognition and security associations between entities that are initially unaware of each others' presence on a network. We refer to a generalized problem of that class as the "hotel discovery problem" due to the following analogy:

A visitor arrives at the airport, intending to reach his destination hotel in the city of arrival. Although the visitor is supposed to reach a specific destination, and although the destination hotel is expecting him, the visitor is ignorant of the identity of the destination hotel. The hotel, of course, must deal with many visitors. The visitor can visit one or more destinations and introduce himself in the hope that one of the visited hotels is his destination and will recognize him. However, such a process may not be feasible if there are many candidate hotels. Therefore, the problem is to find an efficient method of finding the correct hotel with minimal or no third-party assistance. The desired solution must assure the security of the visitor by finding him the right hotel, and must assure the security of the hotel by admitting only the visitors it is expecting.

Surprisingly, the problem outlined above, with various modifications, is applicable to multiple automated communications environments involving client entities or devices (with or without human interfaces) and destination networks or server entities.

For example, a homeowner buys a remotely readable utility meter at a retail center, and installs it in his home. The utility meter needs to discover the utility Website that it will report to, and the utility company needs to discover that the meter has gone on-line. To assure the privacy of the homeowner and to prevent abuse, a security association needs to be established between the utility meter and the utility Website. Conventionally, these operations would be performed through third-party intervention. What has been lacking, until now, is an automated method that can perform the necessary discovery and authentication with little or no on-line assistance from third parties.

SUMMARY OF THE INVENTION

We have provided such a method. In an embodiment, a network entity receives an identifier in a communication from a server on behalf of a client entity authorized for a service. The network entity automatically stores the identifier in a digital storage medium for use in identifying the arrival, at an unspecified time, of a message from the client entity.

At some point in time, the network entity receives a digital communication from the client entity. The digital communication contains the identifier and indicates that the client entity has joined a communication network.

Before or after receiving the client entity communication, the network entity discovers itself to the client entity as a cooperative party for providing the service. To discover itself to the client entity, the network entity automatically generates and transmits at least one message on the communication network.

At a point in time after receiving the client entity communication, the network entity authenticates the client entity through a sequence of automatic steps, on condition that the identifier received in the digital communication from the client entity matches the identifier received in the server communication. The network entity then establishes a permanent security association with the client entity and initiates the service with the client entity.

One benefit of our approach is that whereas an exhaustive search has a worst case complexity of O(n) where n is the number of destination networks or server entities, the complexity of our approach is significantly reduced and runs in constant time (i.e., O(1)).

BRIEF DESCRIPTION OF THE DRAWING

FIGS. 8-10 are exemplary datagram structures for signaling messages useful for practising the invention in some embodiments.

DETAILED DESCRIPTION

Generic Automated Communications Environment

Figure 1:
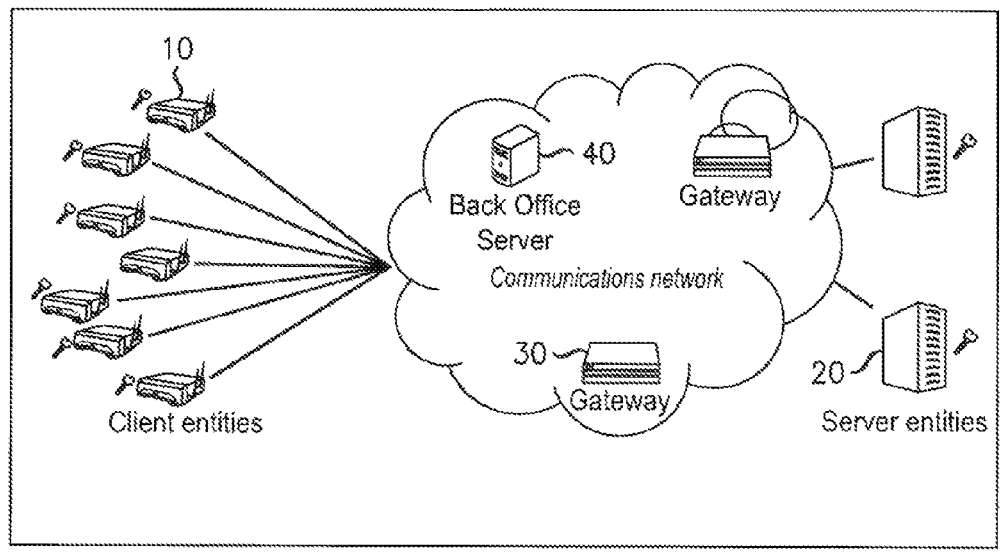
FIG. 1 is a schematic drawing of a representative automated communications environment. The Hotel Discovery problem is applicable to environments as depicted in the figure, among others.

The Hotel Discovery problem is directly applicable to automated communications environments, such as the one depicted in FIG. 1. In this generic setting, consider a set of N client entities 10 and a set of M server entities 20 trying to connect with each other securely.

We define the following Automated Hotel Discovery Problem: Each client entity wants to connect with exactly one server entity, but a server entity may be serving many client entities. The client has no advance knowledge of which server is the one to which it needs to connect, although each server may know the identity of the client it expects to communicate with. The goal is to connect each client entity with its corresponding server entity in a secure manner, i.e. in a manner that prevents a bogus server entity from hijacking a client entity, and that, conversely, guarantees each server entity that it will be talking only to those client entities to which it expects to talk. In the problem as framed here, we assume that client and server entities establish links through a communications network, which includes gateways 30 and back office servers 40 e.g., web portals that are connected to databases).

Realizations of the Hotel Discovery Problem

Realization of the Hotel Discovery problem in mobile communication networks. In one example of a current realization of the Hotel Discovery problem, a mobile phone (in the role of "visitor" in the problem as framed above), upon activation, needs to discover which access network operator (in the role of "hotel") it is supposed to associate with. More specifically, the problem applies if, when a user turns a cellular phone on, the phone does not a priori know the network identity of the operator that it is supposed to be registered with. (An analogous problem may apply to WiFi access in public hotspots.)

The growth of non traditional wireless capable devices such as e-readers, operating in so called open device environments, has made the problem more urgent. For example, e-readers come equipped with wireless interfaces and to an increasing degree, they support multiple wireless technologies in order to broaden the target audience. This approach also allows e-reader manufacturers to leverage trusted yet open retail distribution strategies rather than focus on one operator at a time to distribute their devices.

Accordingly, there is a need for an automated method by which the mobile phone, e-reader, or other user appliance can recognize at least some candidate access networks and securely select the correct one, and by which the access network can restrict admission to only those legitimate devices of which it is already aware, or that it is already expecting.

Realization of the Hotel Discovery problem in M2M communications. Machine-to-Machine (M2M) communications are experiencing widespread growth due to the emergence and the unprecedented potential of M2M applications. Multiple billions of low-cost M2M devices are expected to be deployed with thousands of applications provided by a plurality of M2M operators (M2MO) that leverage a mix of access networks. Early M2M deployments have been characterized by their tight dependency on, and trust in, a single affiliated access network operator, which typically manages most M2M operations and provides a number of essential services.

One currently available service is M2M service discovery, which allows an off-the-shelf M2M device to be given, through appropriate access network procedures, the identity of its affiliated M2MO, and enables it to attach to that M2MO. For example, the M2M device could be pre-configured (e.g. in the factory) to operate with one specific access network provider, while the access network provider has an exclusive agreement with the specific M2MO in a particular area. When the M2M device connects to the access network for the first time, the access network communicates to the device the identity of the M2M Operator, including its address and communications parameters. Subsequently, the M2M device communicates with this specific M2MO.

However, such an architectural model cannot accommodate (expectedly) complex M2M ecosystems made up of large-scale M2M deployments in which the M2MO is decoupled from the access network operator and must manage many, possibly even billions of, devices independently as an M2M service provider.

Figure 2:
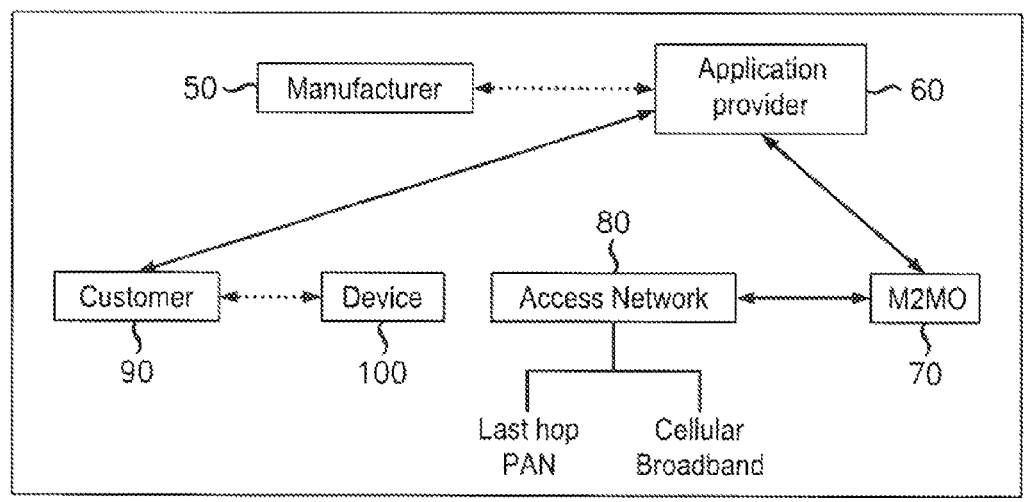
FIG. 2 is a schematic diagram of the various transactional relationships between entities in a complex Machine-to-Machine (M2M) ecosystem.

FIG. 2 schematically represents the transactional relationships that typically connect the various entities that participate in a complex M2M ecosystem either as operators of network entities or as stakeholders of other kinds. These include manufacturers 50, application providers 60, M2M operators 70, access network operators 80, and customers 90 owning or controlling devices 100.

In such complex M2M ecosystems, the M2MO cannot rely on the access network layer for managing M2M service discovery operations. That is, there may lack business relationships between the M2MO and the access network operator, or the access network framework may be inherently incapable of providing such support. (For example, the available access network will often be no more than a simple, pure means of transport without special capabilities.)

Moreover, M2M devices are often manufactured and distributed for commercial availability well before any decision is made regarding specific associations between M2M operators and M2M devices. One consequence is that a large number of off-the-shelf M2M devices which have no user interface for post-configuration will be unaware on initial activation of the identity of the M2MO with which they are to establish an association, and they will have no automatic means of obtaining that information on initial activation. Given the very large population of M2M devices that an M2MO may need to support, it will be understood that non-scalable solutions such as manual pre-provisioning of M2MO-related information may not be feasible.

Accordingly, there is a need for scalable techniques for addressing the problem of enabling M2M devices to discover and associate with the appropriate M2MO. Below, for illustrative purposes, we will describe our techniques as they relate to M2M devices. However, it should be borne in mind that the same techniques are also applicable to M2M gateways as understood, for example, from the definition of "M2M gateway" in ETSI TS 102 690 Technical Specification: Machine-to-Machine Communications (M2M); Functional Architecture.

A realization of the Hotel Discovery problem in advertising. The goal of advertisement is to attract the attention of customers to new products. In a realization of the Hotel Discovery problem as applied to advertising, the customer plays the role of the visitor, while the company that advertises a new product plays the role of the hotel. Accordingly, the goal of the company is to inform the customer about the existence and the value of the product. In response, the customer is expected to establish a relationship with the company that sells the product, as a prospective purchaser of the product.

Modern data mining methodologies have enabled advertisers to identify consumers who are preferred advertising targets.

Accordingly, there is a need for an automated method by which the advertiser is securely enabled to reach its preferred targets, and conversely for customers to receive only the advertisement they prefer.

High Level Description of the Solutions to the Hotel Discovery Problem

We will describe three methods which, as will be shown, can be automated, and which are exemplary solutions to the Hotel Discovery problem. With any of these methods, the visitor can identify and reach the appropriate destination even though he does not know, a priori, the identity of his destination, and even though third parties cannot advise him on a continuing basis. In brief, the solutions are:

1. The hotel is aware of the fact that the visitor wants to reach it and accordingly dispatches a representative to the airport to meet the visitor and pick him up. This applies in limited cases, when the exact time of arrival is known and the security of the visitor and hotel can be confirmed.

2. A group of hotels sends a pick-up van to the airport to pick up various individuals; however, the particular visitor is not explicitly invited or notified. The visitor accepts the ride and proceeds to the hotel, where through a secure negotiation process he determines whether or not this hotel is the intended destination. If it is not, then the visitor returns to the van and proceeds to another candidate destination. (In variations of this scenario, each hotel provides its own van.)

3. The visitor announces his arrival using the media. The hotel that expects the visitor finds out about his arrival and sends a representative to the airport to meet him and bring him to the hotel after verification by the visitor and by the representative.

Below, we will explain how these solutions can be implemented for application to specific communications environments in automated settings. In particular, we will describe a protocol that is effective to ensure security and efficiency, and a system architecture that makes these solutions feasible.

A Framework and Solutions in Automated Communications Environments

Solution to the generic problem. With reference to FIG. 1, we consider an automated communications environment in which a set of N client entities 10 and a set of M server entities 20 are trying to connect with each other securely. We assume that client and server entities establish links through a communications network that includes gateways 30 and back office servers 40. (By "back office server" is meant a web portal, or other similar entity, that is connected to a database and to the network.)

Typically, the client will be a device that has a very limited user interface, or even none at all, and is designed to be able to communicate with the server in the network with little or no human intervention. Techniques of M2M communications, for example, may help the client device to communicate with another machine in the network, such as a network server, automatically and without human intervention.

Some examples of M2M systems are: Utility meters periodically reporting to the utility provider server, medical monitors supplying collected patient data to a hospital's server, automated vehicle modules controlled by a central vehicle computer system, and climate control devices reporting to and controlled by a central physical plant computer.

In one embodiment, server entities and client entities may share a temporary password. The temporary password may be pre-provisioned in the client during manufacture, or alternatively (but only if an appropriate user interface such as a keypad is available), the user of the client may choose a temporary password and enter it into the client.

Further, information about each client is shared with the back office server. The shared information will typically include the temporary password and an identity for the client. This identity must uniquely identify the client to the specific server. The shared information may also include, among other things, the identity of the server to which the client needs to connect, and identity-related cryptographic primitives. The back-office server will typically share this information with an authentication server (discussed below, but not shown in FIG. 1).

With further reference to the Hotel Discovery problem, the server entity in a communications environment as described above plays the role of the hotel, while the client entity plays the role of visitor. In order for a client and a server to identify each other and establish a service association, one or more of the following exemplary approaches—each a solution to the Hotel Discovery problem—may be advantageous:

(1) The server entity obtains the client identity from the back-office server. This information may be announced to the server entity by the back-office server, i.e. be "pushed" to it. Alternatively, the server entity may periodically request this information from the associated back-office server, and receive it in response, i.e. "pull" it.

The server entity then reaches out by sending an advertisement message to the client having that specific identity. Upon receiving the advertisement, the client engages in a mutual authentication session with server entity. This will typically be done through a gateway in the communications network. After successful authentication, the client and server entities execute a more permanent security protocol and discover each other permanently.

Some known security protocols that may be useful in this regard are IBAKE and PAK. See, for example, IETF Internet Draft http://tools.ietf.org/html/draft-cakulev-ibake-01, IBAKE: Identity-Based Authenticated Key Agreement, and IETF RFC 5683, Password-Authenticated Key (PAK) Diffie-Hellman Exchange, http://tools.ietf.org/html/rfc5683.

(2) Advertisements from the server entity take the form of a broadcast message (a "service offer") destined to any "interested" client entity. As above, as soon as a client receives such a broadcast message (an offer), it begins the discovery process. However, receiving a broadcast message does not necessarily result in success. For example, the offer might be received by the client from a wrong service entity, or an unexpected client might attempt to connect to the service entity. In either case, the result will be failure of a mutually authenticated discovery process. In case of failure, the client entity resumes listening to broadcast messages, and attempts to connect to other server entities in succession, until the discovery process mutually authenticates and succeeds.

(3) The client entity initiates the process by requesting an advertisement. This request may be communicated to the Back Office Server through, e.g., a web page access. The Back Office Server may then communicate this request to the serving entity. As soon as the serving entity receives such a request, it sends an advertisement to the client, as described, e.g., in regard to the first of these exemplary approaches. Upon reception of the advertisement by the client, the client and server mutually authenticate each other and subsequently establish permanent credentials relevant to the subscription.

Each of the above three exemplary approaches is described in greater detail below.

Solution to the Problem Realization in Open Device Environments.

Each of the above three approaches may be implemented in an open device environment. It is well understood that generic devices which are not a priori associated with a specific service provider, i.e. not pre-configured to work only and exclusively with a specific service entity, are considered to be open devices. The framework which is defined to accommodate open devices and integrate them in a working system is defined as "open device environment". Examples of open devices include a generic water meter that can work with any water supplier company, or an alarm sensor that can be integrated with any alarm system and be given system-specific credentials. Similarly, e-readers that are not tied to a specific, prescribed network are considered to be open devices.

In accordance with the first approach, the user of the open device may establish temporary credentials (e.g., a temporary password) with an access network of his choice. In other words, the user sets up a temporary business relationship with the corresponding network operator. For example, in a procedure often referred to as "offline pre-provisioning," the user communicates with a back-office server, establishes service subscription, provides device identity, etc. The back-office server in turn provides the identity of the device to the service operator.

It should be noted in this regard that the communication between the user and the chosen network might not involve the particular open device that is of interest. In particular, the open device may not know the temporary credentials and may have to be provided with them by the user through a standard interface such as a keypad. The operator, however, is aware of the existence of the device.

Subsequent to pre-provisioning, the device (in the visitor role) receives an explicit paging message from the operator (in the hotel role), which provides information identifying the network operator and the type of services offered. The device may now send a subscription request to the operator. If the device and the operator mutually authenticate each other successfully, they proceed with establishing the service subscription that will allow setting up a secure session for subsequent communications, including those communicating service data.

In accordance with the second approach, the network operator obtains the identity of the device as described above. However, instead of sending an explicit paging message, the operator broadcasts a generic beacon frame. This generic broadcasted beacon will announce the presence of the operator's service entity to all interested devices in the region. In this respect, it is not targeted to the one specific device, but is rather received and understood by all devices in the broadcast area that expect such announcements. With this beacon, the access network triggers multiple devices into attempting to securely establish a network service session.

What is desired is attachment of the given open device to the correct network. Typically, this will occur after the given device examines one or more of the beacons and attempts to associate with each of several different operators. Eventually, the device will encounter the correct network operator and mutually authenticate with it. Following this, the device and network can proceed to establish the service subscription and if desired, a service session.

In accordance with the third approach, the open device transmits an announcement that an effort to identify the appropriate network operator has started. Upon reception of such an announcement, one or more available networks in the area may send explicit invitations to the device. Using pre-provisioned security credentials, the open device will identify the appropriate network through mutual authentication and subsequently attach to that operator to establish the service subscription or service session.

Application of the three aforementioned approaches to solve the Hotel Discovery problem for M2M. In this section, we will describe exemplary applications of the three aforementioned association strategies to the problem of M2MO discovery for Machine-to-Machine communications. We assume that the M2M device is successfully registered with an access network upon activation, before taking further actions with regards to M2MO discovery and association. In the examples to be described below, the M2MO plays the role of the intended destination, while the M2M device assumes the role of visitor in reference to the Hotel Discovery problem.

Generally, the access network will perform a support role as a transport network for reaching the desired M2MO or the desired M2M device. However, there may also be scenarios in which the access network not only provides transport, but also assumes the functions of the M2MO as described here. For example, in a simple scenario of this kind, the (open) client device is an e-reader, which may download books using the services of any of various telecommunications service providers (TSPs). The back-office server selects one particular TSP, which thereafter serves not only as the serving network, but also as the M2M operator for effectuating the downloading of text from the on-line bookstore.

In accordance with the first approach, the M2MO sends an explicit M2M service layer invitation to the M2M device after being provisioned with the M2M device identity and a set of related parameters. The M2M device receives the invitation and mutually authenticates with the M2MO. Then, the M2M device and the M2MO proceed with the establishment of the M2M service subscription.

In accordance with the second approach, advertisements are broadcast from the M2MO. The purpose of these advertisements is to attract devices that are seeking their designated M2MOs. Upon reception of such an advertisement, the M2M device sends a subscription request to the M2MO. This may initiate mutual authentication, which if successful may be followed by the establishment of a service subscription between the M2MO and the M2M device.

In accordance with the third approach, the M2M device announces its intention to identity an M2MO through a broadcast message. The M2MO receives the announcement and responds by sending an explicit invitation to the M2M device. The invitation includes information directing the M2M device how to proceed with the establishment of a service subscription. The M2MO and the M2M device establish the subscription upon successful mutual authentication.

Solutions to the Problem Realization in Advertising

Motivational examples. In accordance with the first approach, we assume that the company that sells the product is aware of specific customers who will be very interested in purchasing the product. For example, information of this kind may be compiled by applying statistical methods to customer transactional and demographic data. A local car dealer's leaflet advertising luxury cars, for example, might be targeted at potential customers who own expensive houses in a widely known expensive suburban area.

In accordance with the second approach, the company does not address specific customers; instead, it advertises the product using broadcasting means. For example, a large number of customers that would be interested for a new soft drink can be informed through television commercials.

In accordance with the third approach, a customer interested in purchasing a particular product (offered by one or more companies) announces this interest in such a way that candidate companies are notified. (An example is posting the interest on newspapers, public websites, yellow pages, and the like.) In fact, such an announcement may be implicit, since it may be inferrable from other behavior such as the purchase of an item such as an expensive house.

Applications to automated environments. Consider the case of online advertising, where electronic advertisements appear in banners that are embedded within web pages. Whenever an online user clicks on certain links or searches for specific strings using online search engines, such actions and the related data are monitored and shared between network operators and advertisement entities. Intelligent software may log the user's habits and preferences, and may process this information for use in providing advertisements that are personalized to the specific user.

In accordance with the first of the above-described approaches, the company that is interested in selling a product advertises the product to the specific customer or user by visualizing an advertisement that matches the habits and preferences of that customer or user.

In accordance with the second approach, the company broadcasts an online advertisement to all potential customers or users.

In accordance with the third approach, the online user may intentionally click on certain links to trigger software mechanisms that respond by providing advertisements for a specific type of product. It should be noted that this is one scenario in which the user's behavior—i.e., clicking on particular links—may constitute an implicit announcement of his interests and product needs.

An Exemplary System Architecture

Before proceeding with the analysis of how each of the aforementioned three approaches to solving the Hotel Discovery problem can be applied in the case of M2M, we will provide an overview of an illustrative service layer architecture. The architecture is pictorially represented in FIG. 3, to which attention is now directed. It will be understood that whereas the system architecture described here is illustrated in the specific context of M2M environments, those skilled in the art can readily extend the ideas described here to other environments.

Figure 3:
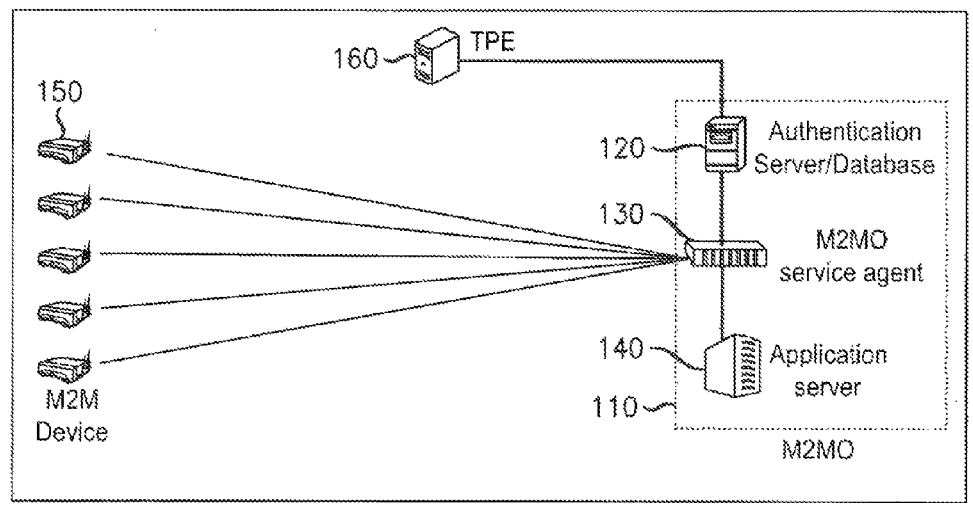
FIG. 3 is a schematic diagram that provides a high-level functional overview of the service layer architecture in a Machine-to-Machine (M2M) ecosystem.

As shown in FIG. 3, the M2MO 110 includes three basic functional entities: an M2M authentication server and database 120 (e.g., an AAA server) which stores the device identities and security credentials of M2M devices and also stores a list of registered devices, an M2MO service agent 130 to communicate information between devices and the M2MO, and an application server entity 140 which may have several different roles. For example, the application server may perform the bootstrapping operations with the M2M devices 150 that generate parameters for the permanent security keys, and it may communicate those parameters to the authentication server. A trusted provisioning entity (TPE) 160 provisions M2M device credentials to the authentication server. Such credentials are used by the M2MO for sending invitations to devices, as well as for securely accepting subscription requests. It should be noted in this regard that any information exchange between a device and the M2MO goes through the M2MO service agent.

As will be understood by those skilled in the art, authentication servers typically run on standard 1U servers or cluster of servers. Many alternatives are possible, of course, including a range of devices from off-the-shelf servers to custom built high-availability ATCA hardware platforms (which may be useful, e.g., for networks in which there is a high transaction volume). Service agents are typically implemented in software running on an appropriate platform. The range of devices that may support application servers is similar to that which may support authentication servers. As a general rule, however, data center server hardware is preferred for supporting authentication and application servers.

We will now discuss an example of how each of the generic approaches discussed above can be applied to M2M communications.

First approach: The M2MO sends an explicit invitation to the M2M device. This approach involves an explicit invitation message sent from the M2MO to the M2M device. More specifically, an M2M device that is purchased off-the-shelf and activated for the first time is not aware of which M2MO it is supposed to be associated with. Recall that a low-cost M2M device may not have a user interface, from which it could potentially obtain such information.

As soon as the M2MO is informed about the existence of the M2M device and its intention to associate for M2M service, the M2MO will construct an M2M invitation and send it to the device. There are various typical procedures with which the M2MO can become aware of the existence of the device. In one example, the owner of the device or of the affiliated M2M application provider contacts the M2MO (either directly or through a third party) and provides the identity of the device along with an optional set of parameters (to be discussed below). With reference to the illustrative architecture of FIG. 3, the TPE is assigned the task of provisioning such information to the M2MO (and specifically, to the authentication server database).

In accordance with this approach, the M2MO will explicitly trigger the device by sending an M2M invitation (analogous to the representative sent to the airport in our statement of the Hotel Discovery problem) that is explicitly destined to the specific M2M device. Such an invitation can be considered as an application layer paging message, indicating the M2MO identity and the M2M device identity along with a set of parameters which we will describe later.

Figure 4:
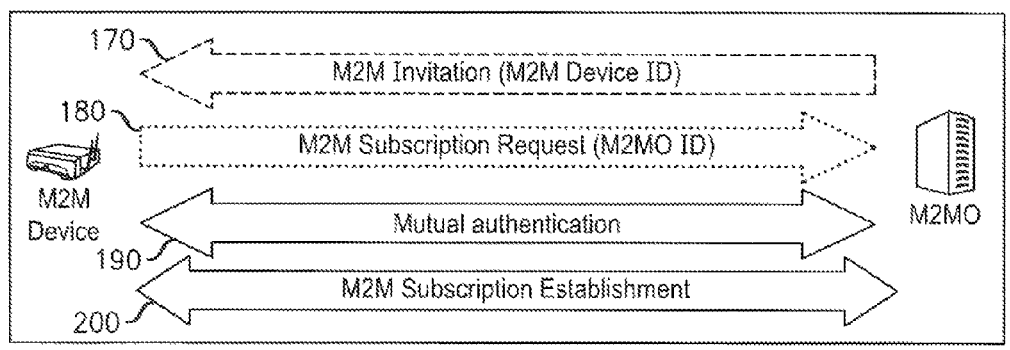
FIGS. 4-6 are message flow diagrams illustrating Machine-to-Machine Operator (M2MO) discovery according to various embodiments of the invention.

The steps of the above procedure are depicted in FIG. 4 and described below in greater detail:

1. The TPE knows the M2M device identity, and provisions the brand affiliation and the identity of the device to the M2MO (specifically, to the authentication server database), including a set of credentials and parameters that are related to the device attachment process and are specific for the particular attachment process to be followed. The TPE may have obtained this information, for example, from the manufacturer, or from data entered by the user or owner of the M2M device through a web interface. Other possible means for acquiring the information will be readily apparent to those skilled in the art. The device identity can be represented, e.g., by the MAC address of the device, by an electronic serial number, or by any other unique identifier that is pre-provisioned to the device during manufacture.

It will be understood that just as identifying information about the device can be communicated to the TPE, the expected device location can also be communicated. This may be advantageous because it potentially allows more focused, regionally limited communications between the M2MO and the device.

2. The M2MO now knows that the M2M device is willing to accept invitations for association and further service registration. If the M2MO is provisioned with (approximate or explicit) information regarding the logical location of access network attachment, the M2MO can direct the explicit M2M invitation message 170 toward that location. Otherwise, the M2MO can broadcast the invitation. Depending on whether or not the M2MO receives a response from the M2M device within a predefined time interval, it may repeat the transmission of the invitation until a response is received. Note that if the M2MO wishes to invite more than one M2M device, the M2M invitation message advantageously contains a list with the identities of all invited devices that potentially lie in a specific area. In such a case, the M2M device simply needs to determine whether its identity is included in the list before sending a response to the M2MO.

3. The M2M device is activated and registers with an access network. The device is now able to receive invitations for M2M service subscription. If the M2M device is pre-configured with the option to respond only to explicit M2M invitations, the device will respond only to the M2M invitation message that includes the specific device identity. Upon reception of such an invitation, the device will respond to the corresponding M2MO with an M2M subscription request 180.

4. The M2MO receives the subscription request. Upon successful mutual authentication 190 between the M2MO and the M2M device, the M2MO and the M2M device will mutually establish the subscription 200. Certain aspects of this procedure will be described in greater detail below.

It should be noted that the sequence of steps as set out above is merely illustrative, and in particular that one or more of the enumerated steps can be combined or subdivided.

Second approach: The M2MO broadcasts an advertisement to all interested M2M devices. In this case the M2MO does not send any explicit invitations, although it is aware of which M2M devices wish to identify the M2MO and associate with it. Alternatively, the M2MO may periodically broadcast a generic (application-level) announcement or advertisement message; this message is analogous to the "pick-up van" in our statement of the Hotel Discovery problem. The frequency of broadcasting is dependent on operator's policies. With such a periodic advertisement, the M2MO seeks to notify devices about its existence so that the devices can become aware of the M2MO and attempt to associate with it. Clearly, the M2MO will accept subscription requests only from M2M devices whose identities are known to the M2MO because it has already been provisioned with them.

Figure 5:
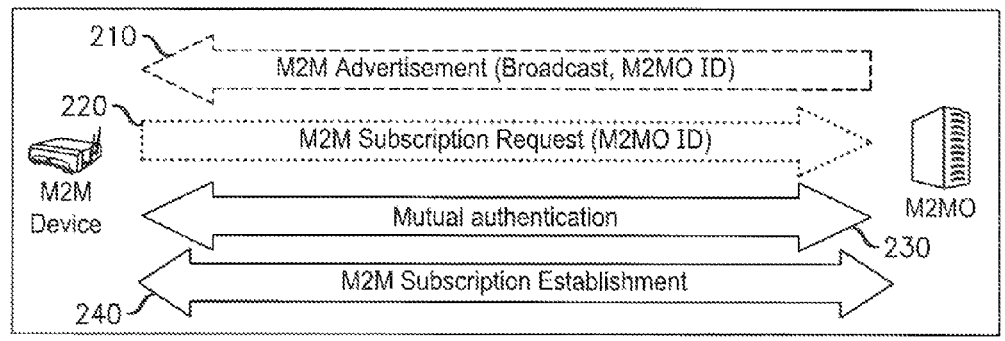

A sequence of steps according to this approach are shown in FIG. 5 and described in greater detail below.

1. As in the first approach, the TPE provisions the M2MO with the device credentials and with a set of parameters that are related to the device attachment process and are specific for the particular attachment process to be followed. The TPE may obtain such information from the manufacturer, from data entered by the user or owner of the M2M device through a web interface, or from other sources. The identity can be represented by, e.g., the MAC address of the device, by an electronic serial number, or by any other unique identifier that is pre-provisioned to the device during manufacture.

2. The M2MO is provisioned with a list of M2M device identities. The M2MO periodically broadcasts an M2M advertisement 210 for as long as one or more M2M devices remain on this list that have not yet established subscription associations. This application-level advertisement includes the identity of the M2MO and possibly a set of further parameters. If the M2MO is aware of approximate logical locations where M2M devices may be attached to an access network or to access networks, the transmission and forwarding of the M2M advertisement may be limited to certain logical regions. Alternatively, the M2MO may decide to "flood" one or more access networks with the advertisement.

3. An M2M device receives the advertisement, processes it, and decides whether it should attempt to initiate the subscription process to the M2M service. The M2M device may base this decision on certain parameters included in the advertisement, as well as on certain parameter values that have been pre-provisioned into the device during installation. (One example of a parameter that may be pre-provisioned is the type of service offered.) If the device determines that the advertised M2MO is a candidate for subscription, the device responds with an M2M subscription request 220.

4. The M2MO receives the subscription request. Upon successful mutual authentication 230 between the M2MO and the M2M device, the M2MO and the M2M devices mutually establish the subscription 240. Certain aspects of this procedure are described in further detail below.

It should be noted that the sequence of steps as set out above is merely illustrative, and in particular that one or more of the enumerated steps can be combined or subdivided.

Third approach: The M2M device announces its interest in finding an M2MO. The third approach is realized by having the M2M device advertise its intention to identify and associate with the appropriate M2MO. In this case, the M2MO passively waits for reception of M2M device-originated advertisements. Upon reception and processing of such advertisements, the M2MO contacts the device and attempts to establish an association with it.

Figure 6:
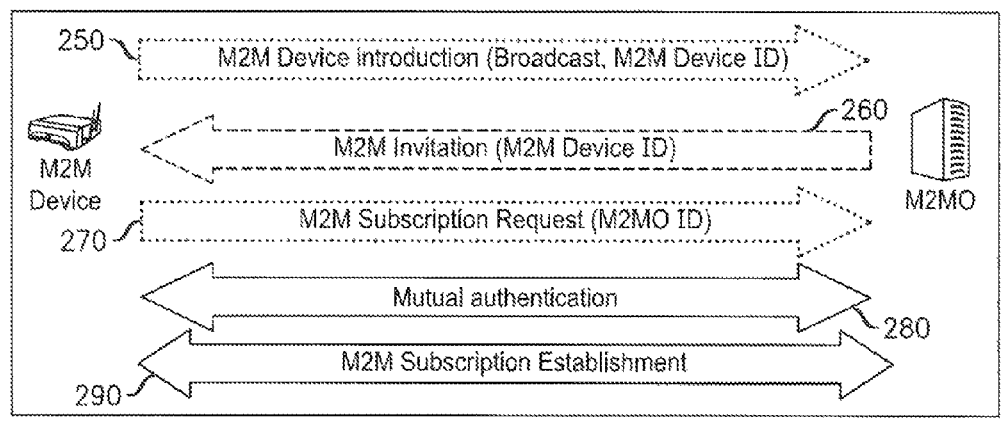

A sequence of steps according to this approach are shown in FIG. 6 and described in greater detail below.

1. The TPE provisions the M2MO with the device credentials and with a set of parameters that are related to the device attachment process and are specific to the particular attachment process followed. The TPE may obtain such information from the manufacturer, from data entered by the user or owner of the M2M device through a web interface, or from other sources. The device identity may be represented, e.g., by the MAC address of the device, by an electronic serial number, or by any other unique identifier that is pre-provisioned to the device during manufacture.

2. As soon as the M2M device is activated and registered with an access network, the device begins periodic broadcasts of an M2M device introduction message 250, which includes the identity of the device.

3. The M2M introduction message reaches one or more M2M operators, which process the message and determine whether or not to contact the M2M device. Generally, one M2MO will recognize the identity included in the M2M introduction advertisement as one with which it has already been pre-provisioned. That M2MO sends an explicit M2M invitation message to the device. This invitation message is similar to the M2M invitation message discussed above in connection with the first approach.

4. Upon reception of the explicit M2M invitation message 260, the device responds to the corresponding M2MO with an M2M subscription request 270.

5. The M2MO receives the subscription request. Upon successful mutual authentication 280 between the M2MO and the M2M device, the M2MO and the M2M device mutually establish the subscription 290. Certain aspects of this procedure are discussed in greater detail below.

It should be noted that the sequence of steps as set out above is merely illustrative, and in particular that one or more of the enumerated steps can be combined or subdivided.

Support for all three approaches. Depending on the pre-configured software and mode of operation for the devices and the M2MO equipment, the M2MO and the M2M device may activate operation in accordance with each of the three approaches described above either individually or in parallel combinations. In the case of operation in a parallel combination of approaches, an M2M device may process and respond to messages originated from an M2MO in accordance with any of the three approaches. Similarly, the M2MO may transmit both explicit invitations and periodic advertisements in accordance with any of the approaches.

Device subscription establishment. M2M service subscription establishment is initiated after the transmission of the M2M subscription request message from the M2M device to the M2MO, and after mutual authentication between the M2MO and the M2M device. (Mutual authentication will typically be achieved using a temporary password, as described below.) A subscription establishment procedure is depicted in FIG. 7, to which attention is now directed.

The process of subscription establishment includes several processes. One constituent process is the bootstrapping of permanent security credentials to be used for service registration. Another possible constituent process is the setting of agreed-upon values for certain parameters related to service subscription.

The subscription establishment procedure is executed between the M2M device and a bootstrap functional entity (e.g., an appropriate server) that belongs to the M2MO. For example, the bootstrap functional entity may be an application server, as seen for example in FIG. 3, which securely communicates the mutually generated permanent security credentials to the M2M authentication server.

Figure 7:
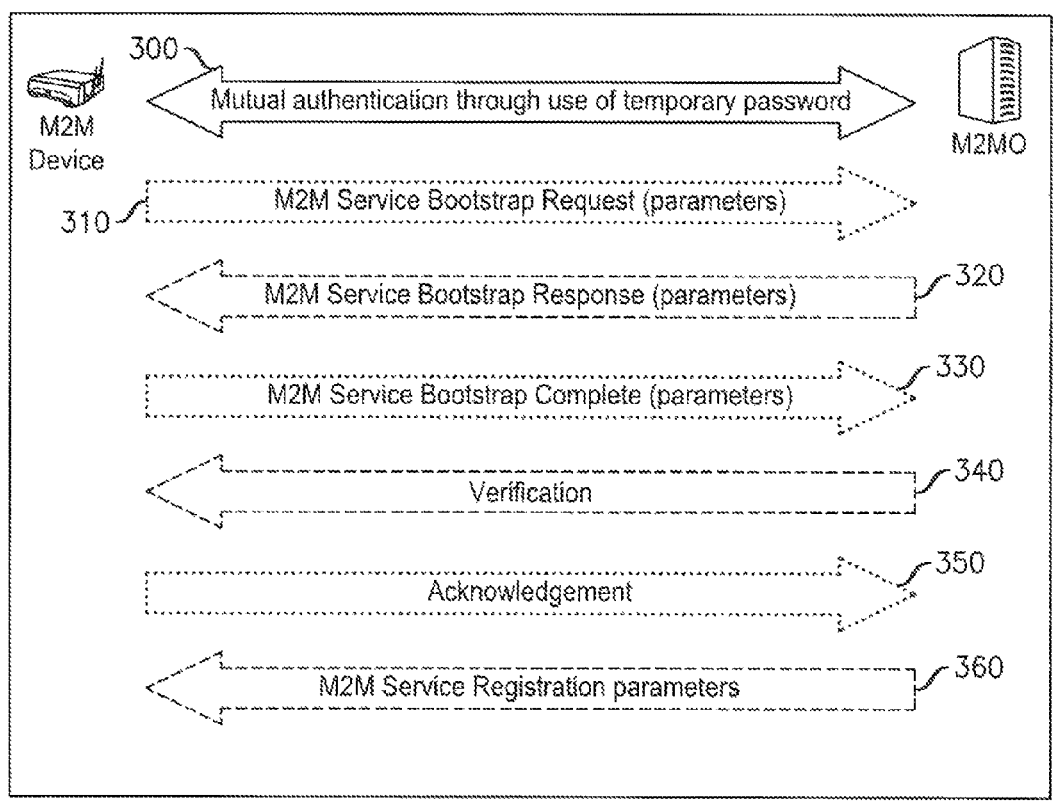
FIG. 7 is a message flow diagram illustrating a procedure for subscription establishment between an M2MO and an M2M device according to an embodiment of the invention.

If the M2M device and the M2MO decide to proceed with the subscription establishment after mutual authentication 300, the M2M device sends an M2M Service Bootstrap Request 310 to the M2MO, as seen in FIG. 7. The M2MO responds by sending an M2M Service Bootstrap Response 320 to the M2M device. Upon successful reception of this message, the M2M device sends an M2M Service Bootstrap Complete 330 to the M2MO, which finalizes the subscription handshake. This three-step handshake between the M2M device and M2MO may facilitate any of various protocols for bootstrapping the security credentials. Appropriate such protocols include IBAKE, PAK, and certificate-based subscription establishment, among others.

After bootstrapping, the M2MO may optionally send a verification message 340 to the M2M device. The M2M device then acknowledges 350 the successful bootstrapping of permanent security credentials. The M2MO may respond to the acknowledgement message with a message 360 that includes service registration parameters.

In general, service and subscription parameters are dependent on the application. Taking, as the M2M application, the particular example of utility metering by way of illustration, the parameters may include (without limitation): Permanent identity, group identity, host server identity, frequency and time slots for transmissions from the device, and broadcast parameters for management interfaces.

Security considerations. It is assumed in the foregoing discussion of M2MO identification and subscription establishment techniques that the identity of the M2M device has been pre-provisioned to only one legitimate M2MO, which accordingly responds to M2M subscription requests. In addition, certain security procedures to be followed before and during subscription establishment can enable the M2M device to determine whether a candidate M2MO is legitimate and whether it is the appropriate M2MO for service subscription. Whether it is the "appropriate" M2MO is determined based on its identity and the success of mutual authentication.

An M2M device will agree to establish the subscription and to register for service only if it verifies the identity of the M2MO, thereby assuring that it is not a rogue M2MO. Similarly, the M2MO needs to first verify the credentials of the M2M device before proceeding with the subscription establishment.

One way to carry out the required verifications uses a temporary password associated with the M2M device identity. This password is provisioned to both the M2M device and the M2MO during an offline step. More specifically, the temporary password is pre-provisioned to the M2M device during manufacture. Before the initial activation of the device, the password is (offline) provisioned by the TPE to the M2MO together with the identity of the M2M device. (The TPE may obtain the password and identification data from the device manufacturer, or from other sources.)

The M2MO and the M2M device can use the temporary password to mutually authenticate each other before subscription establishment. Any of various known authentication procedures may be used for the authentication operation. One such procedure is the AKA (Authentication and Key Agreement) protocol, described, for example, in 3rd Generation Partnership Project, 3*GPP Technical Specification* 3*GPP TS* 33.102 *V*9.0.0: Technical Specification Group Services and System Aspects; 3G Security; Security Architecture, September 2009.

Using the temporary password with an appropriate authentication procedure, the M2M device can assure that the M2MO is the correct one. The authentication procedure also discourages other M2M operators from the abusive practice of deliberately attracting the M2M device in order to deny it the opportunity to associate with the appropriate M2MO.

It should be noted in this regard that temporary password-based authentication is only one example, and that various alternatives can also be used.

For example, one alternative is a One Time Pad (OTP) created by the M2MO and IBE-encrypted with the identity of the M2M device. The M2M device decrypts the One Time Pad and returns it to M2MO, thus proving to the M2MO its ability to decrypt the OTP, and thereby authenticating itself to the M2MO. For a discussion of OTP, see N. Haller et al., *A One-Time Password System*, RFC2289, http://www.ietf.org/rfc/rfc2289.txt.

In another alternative procedure, the M2M device retains the password and uses it as the Digest of CHAP PW for authenticating itself to the M2MO. For a discussion of CHAP P W, see W. Simpson, *PPP Challenge Handshake Authentication Protocol* (*CHAP*), RFC 1994. http://www.faqs.org/rfcs/rfc1994.html.

In ideal transactions, a legitimate and non-compromised M2MO responds to M2M subscription requests only from M2M devices whose identities are already known to the M2MO. Because a legitimate M2MO will acquire no business-related benefit by attempting to establish a service subscription with an unknown device, a legitimate M2MO will (ideally) ignore or reject subscription requests from all M2M devices whose identities have not been provisioned a priori.

We wish to point out the following reason why it is advantageous to invoke security protocols such as IBAKE or PAK upon successful mutual authentication: These protocols guarantee that the established permanent key will be known only to the M2M device and the M2MO. In particular, the TPE and the device manufacturer will not learn the permanent bootstrapped key.

Message Contents and Formats

Below, we will provide examples of formats that may be used for the messages exchanged between the M2MO and the M2M device in the course of the M2MO discovery phase.

(1) M2M invitation: This message is sent from the M2MO to the M2M device in the following two cases:

(a) The M2MO is aware of the identity of the device and hence it proactively sends an explicit M2M invitation to the device (or to a list of devices).

(b) The M2MO receives an M2M device introduction message (see below) from an M2M device and responds with an M2M invitation to that device (or list of devices).

An exemplary M2M invitation message datagram is structured as shown in FIG. 8. The illustrated structure can be embedded, e.g., as a payload in TCP/UDP/IP packets. The M2M invitation advantageously contains the following information, among other communication parameters:

Version: To specify the application layer protocol version of this packet.

Type: To specify the type of this packet, e.g. "M2M_INVITATION".

M2MO Identity: To identify the M2M operator, as defined by the specific standard(s) that is adopted.

Priority: To optionally indicate the sending priority for this message.

Count IDs: To identify the number of M2M device identities (to which the invitation is destined) included in this message.

Auth Type: To indicate the authentication method according to which the M2M device(s) receiving this invitation can verify that the M2MO is legitimate. A packet with unknown Auth Type should be discarded by M2M devices.

Invitation Interval: To optionally identify the time interval between invitations. Certain occasions with misconfigured M2M devices may need this value; it can also be used as a countermeasure against denial-of-service attacks.

Checksum: To assist recipient devices in detecting data corruption in the M2M invitation message. A description of known practices relating to the Checksum is found, e.g., in R. Braden et al., RFC 1071, *Computing the Internet Checksum*, http://www.faqs.org/rfcs/rfc1071.html.

M2M Device Identity (x): To identify the intended M2M device recipients that the M2MO seeks to attract. A list of identities may be included in the M2M invitation, for all the devices that the M2MO wants to reach through this message. Depending on the availability of location information during the initial activation of M2M devices, different (potentially simultaneous) M2M invitations (forwarded towards different locations) may contain different lists of M2M device identities.

M2M Service Parameters: To optionally identify preliminary parameters that may be useful to M2M devices prior to subscription. As an example, the field may include information regarding the type of M2M services offered, etc.

Authentication Data: To contain information related to Auth Type field, regarding the authentication method and parameters with which an M2M device may verify the identity of the M2MO that sends the invitation.

(2) M2M advertisement: This message is sent from M2MO periodically; it is of broadcast nature and does not specifically address any particular M2M device.

An exemplary M2M advertisement message datagram is structured as illustrated in FIG. 9.

The M2M advertisement message may contain the Version, Type, M2MO Identity, Priority, Authentication Type, Advertisement Interval, Checksum, Authentication Data, and other M2M Service parameters.

The above message can be embedded as payload into TCP/UDP/IP packets. The fields that constitute the structure are similar to the fields of the M2M invitation message. However, since the advertisement is not explicitly destined to any M2M devices in particular, the message does not include any M2M device identities or the Count IDs field. Alternatively, the datagram format of the M2M invitation can be reused here, wherein the Type field would specify that this is an M2M advertisement, the Count IDs value would be set to the "default" value of zero, while the M2M Device Identity field(s) would also be set to NULL, indicating that this is a broadcast message.

(3) M2M device introduction: The M2M device introduction is a broadcast message that is originated from an M2M device upon registration with an access network. This message is used by the M2M device in its attempts to reach one or more candidate M2M operators. An exemplary M2M device introduction message datagram is structured as illustrated in FIG. 10.

The M2M device introduction message may contain Version, Type, M2M Device Identity, Priority, Authentication Type, Transmission Interval, Checksum, Authentication Data, and other M2M Service Parameters.

The above message can be embedded as payload into TCP/UDP/IP packets. The structure is similar to the structure of the M2M advertisement message. The only difference is that the M2M Device Identity field has replaced the M2MO Identity field. (It should be noted, however, that the M2M device introduction message may include different M2M Service Parameters—or different parameter values—from those that would be used in the M2M advertisement message.) Again here, alternatively the datagram format of the M2M invitation can be reused here, wherein the Type field would specify that this is an M2M device introduction, the M2M device identity would replace the M2MO identity, the Count IDs value would be set to the "default" value of zero, while the M2M Device Identity field(s) would also be set to NULL, indicating that this is a broadcast message.

It will be understood that the methods described here are suitable for implementation on any network that supports an M2M environment. Such networks may be fixed, wireless, or a combination of fixed and wireless. As described here, our methods are applicable in particular to networks that support packet communication according to the IP suite of protocols, but our methods are not limited in application to networks of that kind. It will be understood further that a "server" as that term is used here is a software functionality that may run on any suitable computing machine having a network interface; such machine may, e.g., be a general or special purpose digital computer or a series of such computers.

What is claimed is:

1. A method to be performed by a network entity, comprising:
   receiving an identifier in a communication from a server on behalf of a client entity authorized for a service;
   automatically storing the identifier in a digital storage medium for use in identifying the arrival, at an unspecified time, of a message from the client entity;
   receiving a digital communication from the client entity, wherein the client entity communication contains the identifier and indicates that the client entity has joined a communication network;
   determining that the digital communication from the client entity is an implicit request to provide the service based on one or more characteristics associated with the service;
   before or after receiving the client entity communication, discovering the network entity to the client entity as a cooperative party for providing the service, wherein said discovering step is performed by automatically generating and transmitting at least one message on the communication network, and wherein a direction and a time for transmitting the at least one message are based on an expected logical location of the client entity;
   after receiving the client entity communication, authenticating the client entity through a sequence of automatic steps, on condition that the identifier received in the client entity communication matches the identifier received in the server communication;
   establishing a permanent security association with the client entity; and
   initiating the service with the client entity.

2. The method of claim 1, wherein the discovering step is performed, before receiving the client entity communication, by transmitting on the communication network a plurality of repeat messages containing information that identifies the client entity.

3. The method of claim 2, wherein the plurality of repeat messages are transmitted to multiple client entities.

4. The method of claim 2, wherein the plurality of repeat messages are sent to a single client entity.

5. The method of claim 1, wherein the discovering step is performed in response to receiving the client entity communication.

6. The method of claim 1, wherein the network entity is a Machine-to-Machine Operator and the client entity is a Machine-to-Machine device.

* * * * *